(12) United States Patent
Bayerle et al.

(10) Patent No.: US 6,973,777 B2
(45) Date of Patent: Dec. 13, 2005

(54) SYSTEM AND METHOD FOR MONITORING THE FEEDING OF SECONDARY AIR INTO THE EXHAUST AS OF AN INTERNAL COMBUSTION ENGINE

(75) Inventors: Klaus Bayerle, Obertraubling (DE); Frank Hacker, Regensburg (DE); Hong Zhang, Tegernheim (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/637,644

(22) Filed: Aug. 11, 2003

(65) Prior Publication Data

US 2004/0107693 A1  Jun. 10, 2004

(30) Foreign Application Priority Data

Oct. 23, 2002  (DE) ................. 102 49 421

(51) Int. Cl.⁷ ............................ F01N 3/00
(52) U.S. Cl. ............. 60/289; 60/274; 60/276; 60/285; 60/293
(58) Field of Search ............ 60/274, 276, 277, 60/285, 289, 290, 291, 292, 293

(56) References Cited

U.S. PATENT DOCUMENTS

| | | | | |
|---|---|---|---|---|
| 5,381,658 A | * | 1/1995 | Meguro ..................... | 60/276 |
| 5,388,402 A | * | 2/1995 | Aoki et al. ................ | 60/276 |
| 5,444,978 A | * | 8/1995 | Yoshizaki et al. ......... | 60/276 |
| 5,852,929 A | * | 12/1998 | Kato et al. ................. | 60/274 |
| 6,122,910 A | * | 9/2000 | Hoshi et al. ............... | 60/297 |
| 6,170,259 B1 | * | 1/2001 | Boegner et al. ........... | 60/286 |

* cited by examiner

*Primary Examiner*—Binh Q. Tran
(74) *Attorney, Agent, or Firm*—Morrison & Foerster LLP

(57) ABSTRACT

The internal combustion engine has at least two partly separate exhaust systems in each of which are disposed a catalytic converter, and upstream thereof, a lambda probe. There is provided a secondary air pump and a number of individual secondary air lines, corresponding to the number of exhaust systems, for delivering secondary air to the respective exhaust systems. From the signal of at least one air mass meter, a value is determined for the total air mass flow introduced into the exhaust systems. In order to determine the air mass actually introduced into the individual exhaust systems, the output signals from the lambda probes in the exhaust systems are used to identify an uneven distribution of the air mass fed to the individual exhaust systems.

18 Claims, 3 Drawing Sheets

SYSTEM AND METHOD FOR MONITORING THE FEEDING OF SECONDARY AIR INTO THE EXHAUST AS OF AN INTERNAL COMBUSTION ENGINE

CLAIM FOR PRIORITY

This application claims priority to International Application No. 10249421.5 which was filed in the German language on Oct. 23, 2002, which is hereby incorporated by reference.

TECHNICAL FIELD OF THE INVENTION

The invention relates to a system and method for monitoring the feeding of secondary air into the exhaust gas of an internal combustion engine.

BACKGROUND OF THE INVENTION

The pollutant emission of an internal combustion engine can be effectively reduced by catalytic after-treatment using catalytic converters in conjunction with a lambda control device. However, an important requirement for this is that not only the lambda probe of the lambda control device but also the catalytic converter has reached its light-off temperature.

One option for rapidly heating up the catalytic converter consists in blowing secondary air into the exhaust manifold of the internal combustion engine downstream of the outlet valves. The secondary air is supplied by a secondary air pump and fed into the exhaust gas downstream of the outlet valves of the internal combustion engine via a ducting system containing a secondary air valve. The exothermic reaction of the secondary air with unburned fuel in the hot exhaust gas and its further oxidation before and in the catalytic converter results in accelerated heating of the catalytic converter to its operating temperature, thereby reducing the pollutant emissions in the warm-up phase of the internal combustion engine.

Legislative requirements provide for monitoring of the secondary air system, specifically to ensure compliance with a minimum value for the injected secondary air mass flow.

For monitoring of the secondary air mass flow, the provision of a separate air mass meter in the secondary air line is disclosed, for example, in DE 197 13 180 C1. The measurement signal of the air mass meter is recorded, the variation over time of said measurement signal is determined and a malfunction of the secondary air inflow is detected if the variation does not correspond to a predefined variation.

EP 0 928 366 B1 discloses a secondary air system for an internal combustion engine having a secondary air pipe. The air pipe is connected to an intake manifold via an inlet port and to an exhaust manifold via an outlet port. The inlet port is disposed downstream of an air flow meter measuring the air mass flowing into the cylinders of the internal combustion engine and upstream of a throttle valve. The secondary air system comprises a secondary air valve which is disposed in the secondary air pipe, and a control device with an observer which controls the opening angle of the secondary air valve. The observer, which incorporates a physical model of the intake manifold and of the secondary air system, determines an estimate of a secondary air mass flow as a function of the opening angle of the throttle valve, the engine speed and a measured value of a first air mass flow which is determined by the air mass meter.

DE 196 09 922 A1 discloses a method for monitoring secondary air injection for an internal combustion engine using a sensor for measuring the oxygen content of the exhaust gas. The method is based on the reaction of the sensor to the application of the secondary air, the amount of air sucked in by the internal combustion engine being increased when air is fed to the exhaust gas.

DE 199 52 836 C1 discloses a method for monitoring a secondary air system in combination with the exhaust system of an internal combustion engine wherein the operational efficiency of the secondary air system is assessed on the basis of a mathematically determined secondary air flow.

With the known methods, only the total secondary air mass flow fed to the exhaust gas is determined. For internal combustion engines which have different cylinder groups with separate catalytic converters, and therefore a multiflow exhaust system, such as a V-engine, for example, no distinction is made between the individual cylinder banks. Although in the event of partial line closure of or a leak in the secondary air system on one cylinder bank, this may result in an insignificant variation in the total secondary air mass flow, it can nevertheless cause a serious unequal distribution between the cylinder banks.

Future legislation prescribes that the individual cylinder banks must be monitored separately for adequate secondary air mass flow.

DE 100 65 963 A1 shows an arrangement for feeding secondary air into the exhaust gas of an internal combustion engine having various cylinder groups with separate catalytic converters. The cylinder banks of a V-engine are quoted as examples of various cylinder groups. Proposed here is cylinder-specific feeding of secondary air with at least two partly separate exhaust gas ducts using a secondary air pump, with secondary air lines which connect the outlet side of the secondary air pump to one of said separate secondary air lines. In each of the secondary air lines there is provided a separately controllable means of flow control. There is additionally provided on the outlet side of the secondary air pump another controllable port whose opening angle influences the pressure in said secondary air lines. This enables catalytic converter heating to be implemented by means of secondary air in conjunction with a rich mixture for each cylinder group independently of the other cylinder group. Secondary air system diagnostics are not discussed in this publication.

SUMMARY OF THE INVENTION

The present invention discloses a method for monitoring the feeding of secondary air into the exhaust gas of an internal combustion engine having a plurality of cylinder banks.

In one embodiment of the invention, there is a method for monitoring feeding of secondary air into an exhaust gas of an internal combustion engine. The method provides at least two partly separate exhaust systems in each of which are disposed a catalytic converter and, upstream thereof, a lambda probe. Secondary air is delivered to one of the respective exhaust systems via a secondary air pump and a plurality of individual secondary air lines corresponding to the exhaust systems, and a signal value for a total air mass flow introduced into the exhaust systems from at least one air mass meter is determined. In order to determine the air mass actually introduced into the individual exhaust systems, the output signals from the lambda probes in the exhaust systems are used to identify an uneven distribution of the air mass fed to each of the exhaust systems.

In another embodiment of the invention, there is a system for monitoring feeding of secondary air into an exhaust gas of an internal combustion engine. In the system, there are at least two partly separate exhaust systems in each of which are disposed a catalytic converter, and upstream thereof, a lambda probe, a secondary air pump and a plurality of individual secondary air lines corresponding to the plurality of exhaust systems to deliver secondary air to each of the respective exhaust systems, and at least one air mass meter from whose signal a value for the total air mass flow introduced into the exhaust systems can be determined. In order to determine the air mass actually introduced into each of the exhaust systems, the output signals from the lambda probes in the exhaust systems are used to identify an uneven distribution of the air mass fed to the individual exhaust systems.

BRIEF DESCRIPTION OF THE DRAWINGS exemplary embodiments of the invention will now be explained in greater detail with reference to the accompanying drawings, in which.

DETAILED DESCRIPTION OF THE INVENTION

Figure 1:
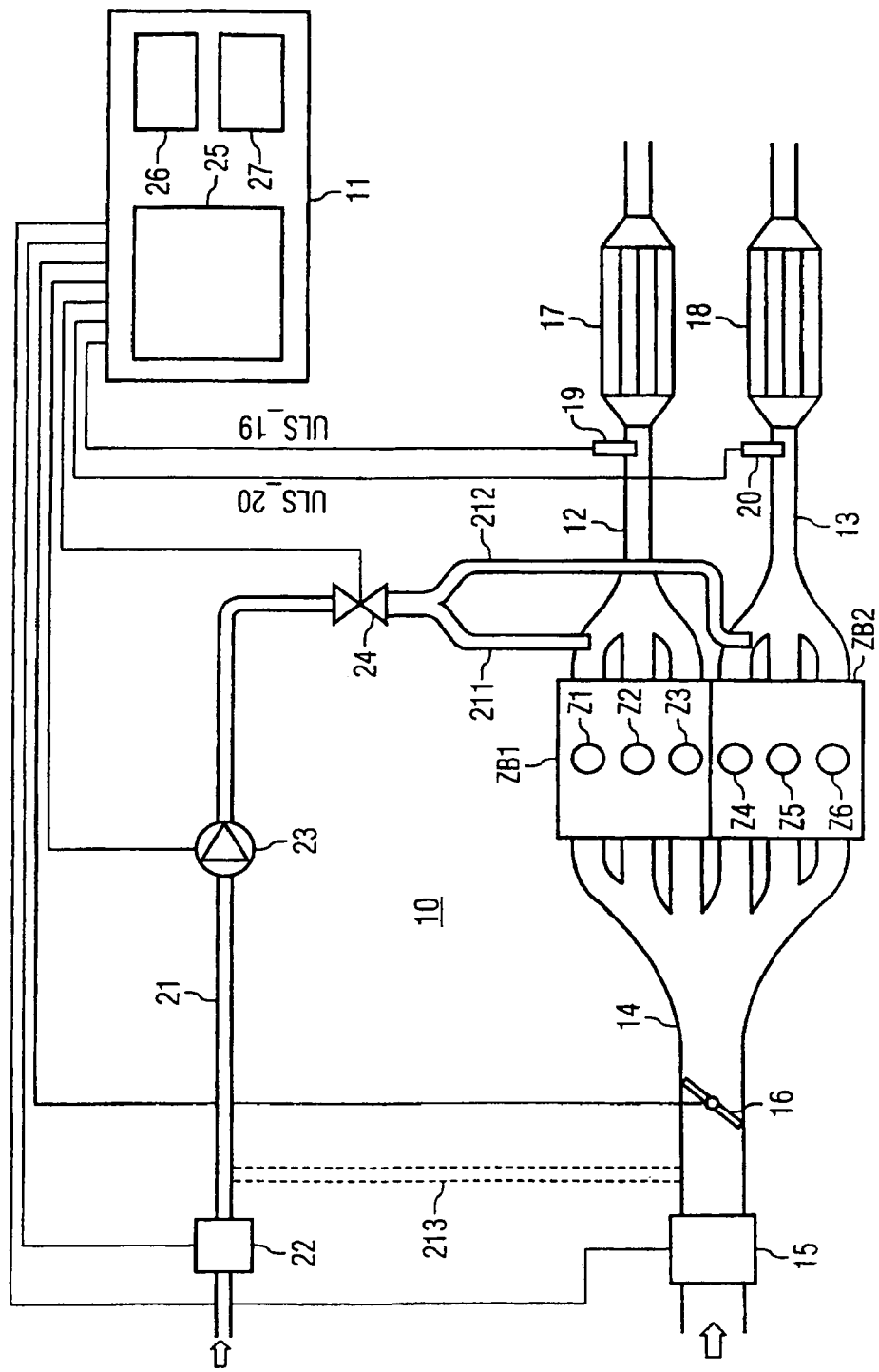
FIG. 1 shows an internal combustion engine with two cylinder banks and a secondary air system.

FIG. 1 shows an internal combustion engine 10 with an associated electronic control device 11, only the components necessary for understanding the invention being illustrated. In particular the fuel circuit has been omitted.

The internal combustion engine 10 has six cylinders Z1–Z6 arranged in banks of 3 cylinders each. The first cylinder bank ZB1 is assigned the cylinders Z1, Z2, Z3 whose exhaust gas flows into a common exhaust system 12. The cylinders Z4, Z5, Z6 are disposed in a second cylinder bank ZB2 whose exhaust gas flows into a common exhaust system 13. The internal combustion engine 10 is supplied with the air necessary for combustion via an intake port 14. In the intake port 14 there is provided an air mass meter 15 followed by a throttle valve 16 viewed in the flow direction of the intake air. The air mass meter 15 is used as a load sensor for so-called air mass control of the internal combustion engine 10. The throttle valve 16 is, for example, an electrically controlled throttle element (E-gas) whose opening cross-section can be set not only by operation by the driver of the vehicle powered by the internal combustion engine (driver requirement) but also via signals from the control device 11 depending on the operating range of the internal combustion engine 10.

The exhaust system 12 incorporates a catalytic converter 17, and the exhaust system 13 incorporates a catalytic converter 18, the catalytic converters having 3-way characteristics. These catalytic converters can be followed by further exhaust gas after-treatment components such as NOx traps.

Upstream of the catalytic converter 17 there is disposed a lambda probe 19, and upstream of the catalytic converter 18 there is disposed a lambda probe 20, these being preferably so-called linear lambda probes. However, the invention can also be employed using so-called binary lambda probes (dual probes). The lambda probes 19, 20 are connected to the control device 11 via lines not described in further detail, likewise the air mass meter 15 and the throttle valve 16.

The internal combustion engine 10 is equipped with a secondary air system. It has a secondary air line 21 which is used to introduce secondary air from the environment into the two exhaust systems 12, 13. A secondary air mass meter 22 is provided in the secondary air line 21 for determining the secondary air mass. The secondary air is delivered by means of a secondary air pump 23 that can be controlled via signals from the control device 11. In a simple embodiment, the secondary air pump 23 has a constant output but can also be speed-controlled so that the output can be adjusted.

In the section of the secondary air line 21 connected to the outlet of the secondary air pump 23, there is inserted a secondary air valve 24 which can be used to vary or even completely close the opening cross-section of the secondary air line 21. Downstream of the secondary air valve 24, the secondary air line 21 branches into two sub-sections 211, 212, sub-section 211 joining the exhaust system 12 and sub-section 212 joining the exhaust system 13. The junctions of the sub-sections with the corresponding exhaust systems are only shown schematically here, the secondary air preferably being blown in immediately after the outlet valves.

FIG. 1 shows another line 213 (dashed) which branches off from the intake port 14 downstream of the air mass meter 15 and upstream of the throttle valve 16 and joins the secondary air line 21 upstream of the secondary air pump 23. This line is necessary when no secondary air mass meter 22 is present. The secondary air is, in this case, sucked in via the air mass meter 15 in the intake port 14 and determined together with the air mass flowing into the cylinders for combustion.

To control and regulate the internal combustion engine 10, further signals are transmitted to the control device 11 by sensors (e.g. temperature sensors for intake air, boost air, coolant; speed sensor, boost pressure sensor, etc.). Conversely, the control device 11 produces signals for actuators (e.g. injection valves, controlling elements, etc.).

Such electronic control devices, which generally include one or more microcomputers and perform other control functions in addition to ignition control for a gasoline engine and injection time calculation, are known to the skilled artisan, so that the following will only describe the configuration as it relates to the invention and its operation. The control device 11 also includes the lambda control device 25, a memory 26 in which various engine maps and threshold values are stored, as well as a fault memory 27.

How the feeding of the secondary air can be monitored will be explained with reference to the flow charts in FIGS. 2A and 2B.

After starting of the internal combustion engine, a check is performed in a process S1 to ascertain (i.e. determine) whether specified diagnostic conditions are satisfied. These include in particular that the internal combustion engine is at a steady-state operating point, the lambda probes are operational and the secondary air system is activated.

If the diagnostic conditions are satisfied, in process S2 the signals of the lambda probes 19, 20 are read in, otherwise the sequence branches to the start of the process. These lambda signals of the two lambda probes 19, 20 are then set in relation to one another. If linear lambda probes are used, the ratio of the lambda probe output signals ULS_19/ULS_20, i.e. the quotient, can be formed (process S3). In process S4 the result of the ratio forming undergoes statistical analysis, e.g. a number of n measured values is analyzed. Then in process S5 a check is performed to ascertain whether the statistical result is within a permissible, predefined tolerance band. This tolerance band can be dependent on various parameters, such as ambient temperature, exhaust gas back pressure, ambient pressure, absolutely measured lambda.

If the statistical result is within the tolerance band, in process S6 it is established that no fault is present in respect of an uneven distribution and the process is concluded with process S7. If the secondary air system is working properly, the ratio is within the bandwidth. Preferably 1.0+/−tolerance band. If the statistical result is outside the tolerance band, a decision is made in process S8 as to whether the fault lies with cylinder bank ZB1 or cylinder bank ZB2. For this purpose analysis is performed to ascertain whether the ratio is greater or less than the value 1. In the case of a value <1, the secondary air mass flow to the first cylinder bank ZB1 is too low, in the case of a value >1, the secondary air mass flow to the second cylinder bank ZB2 is too low. However the reverse assignment is also conceivable.

In process S8 a temporary i.e. suspected fault in the form of an uneven distribution of the secondary air mass is deemed to be present in the corresponding exhaust system.

The upper and lower limit of the tolerance band are dependent on the abovementioned variables stored in the memory 26 of the control device 11.

Figure 2A:
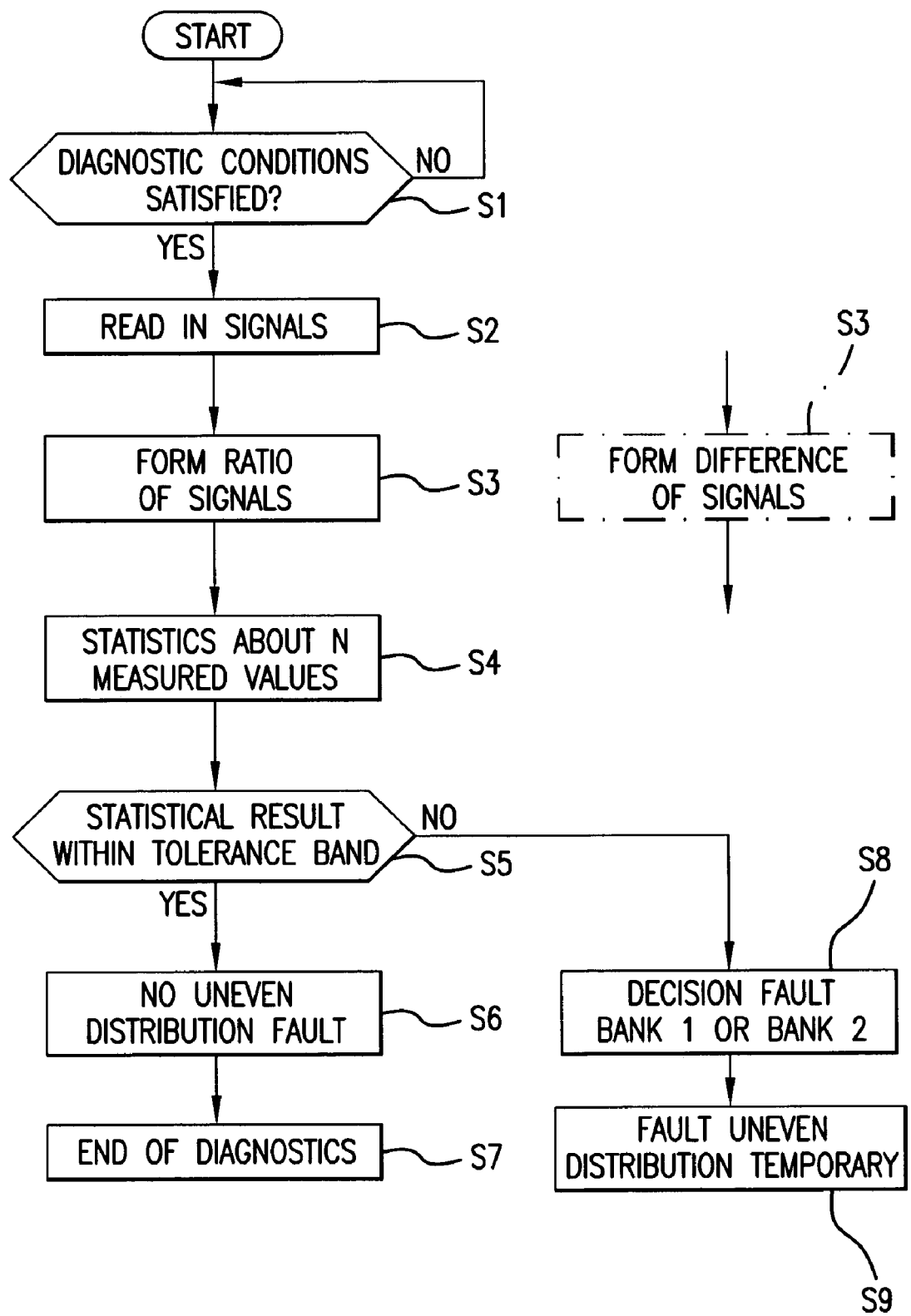
FIG. 2 shows a flowchart for monitoring the supply of secondary air.

Alternatively, instead of forming the ratio of the two lambda probe signals ULS_19, ULS_20 in process S3, it is also possible to form the difference of the two lambda probe signals using process S3' as indicated in FIG. 2A. The subsequent process sequence is identical to the process already described, subject to the proviso that a tolerance band having other limits is used.

In addition, when using linear lambda probes, the air figures can be used instead of the output signals for forming the ratio or difference.

If the system uses binary lambda probes for which the output signal exhibits a step change for lambda=1, after detecting that the probe is operational, lambda control is activated simultaneously with secondary air operation. Uneven distribution can be inferred from the ratio or the difference of the lambda controller deviation of the two cylinder banks with respect to one another.

The process described can be invoked either immediately after starting of the internal combustion engine or when problems with the even distribution are deemed to be present on the basis of variations in the secondary air mass flow.

Figure 2B:
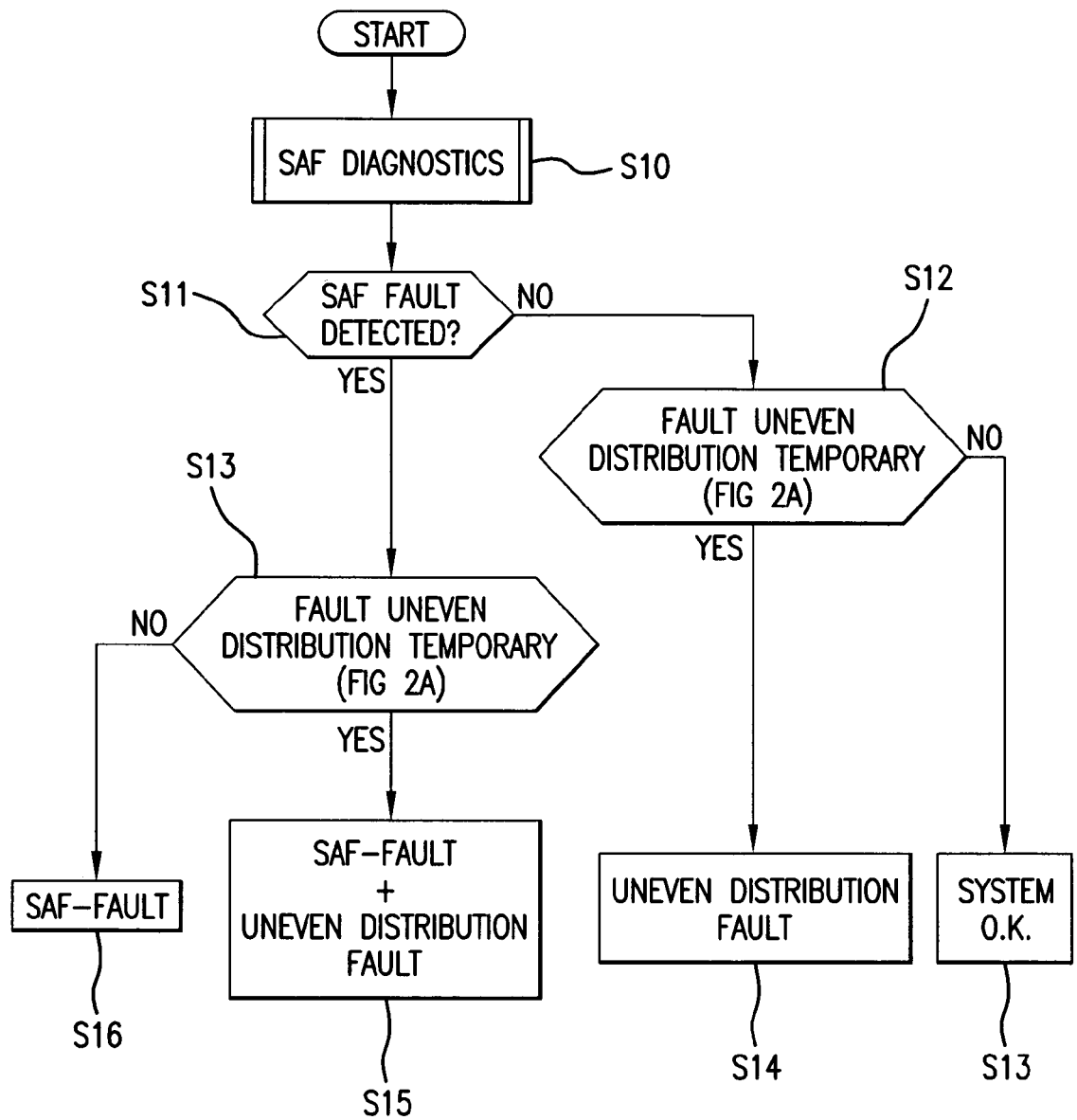

In order to ascertain variations in the secondary air mass flow, after starting of the internal combustion engine a further routine is executed which is shown in greater detail in FIG. 2B. In process S10, secondary air mass flow diagnostics are performed. These diagnostics can be performed according to any known method, as described, for example, in DE 197 13 180 C1 or EP 0 928 366 B1.

If the diagnostics indicate that no fault is indicated (interrogation in process S11), an interrogation is performed in process S12 to ascertain whether a temporary fault in respect of uneven distribution is present. This information is obtained as described with reference to FIG. 2A.

If no temporary fault in respect of uneven distribution is present, it is established in process S13 that the secondary air system is OK.

If the diagnostics indicate that no fault is present (interrogation in process S11) but that there is a temporary fault in respect of uneven distribution (interrogation in process S12), it is established in process S14 that a fault in respect of uneven distribution is present. The fault classified as temporary according to process S9 in FIG. 2A is therefore confirmed.

If process S11 detects a fault in the secondary air mass flow, a check is performed in the subsequent process S13 to ascertain whether a temporary fault in respect of uneven distribution is present. This information is obtained as described with reference to FIG. 2A. If this is the case, it is established in process S15 that a fault is present in the secondary air mass flow, and the fault classified as temporary according to process S9 in FIG. 2A is also confirmed.

If a fault in the secondary air mass flow is deemed to be present in process S11, but the interrogation in the subsequent process S13 yields a negative result, i.e. no temporary fault in respect of uneven distribution is present, it is established in process S16 that there is a fault in the secondary air mass flow.

The error messages detected in process S14, S15 and S16 are entered in the fault memory 27 of the control device and can be additionally communicated visually and/or audibly to the driver of the vehicle.

The invention has been explained with reference to a 6-cylinder internal combustion engine whose cylinders are arranged in one straight line (in-line engine) and which has two separate exhaust systems. The method according to the invention can also be used for all internal combustion engines with secondary air system and having more than two separate exhaust systems, particularly for the cylinder banks of V-engines.

What is claimed is:

1. A method for monitoring feeding of secondary air into an exhaust gas of an internal combustion engine, comprising:
    providing at least two partly separate exhaust systems in each of which are disposed a catalytic converter and, upstream thereof, a lambda probe;
    delivering secondary air to one of the respective exhaust systems via a secondary air pump and a plurality of individual secondary air lines corresponding to the exhaust systems; and
    determining a signal a value for a total air mass flow introduced into the exhaust systems from at least one air mass meter, wherein
    to determine the air mass actually introduced into the individual exhaust systems, the output signals from the lambda probes in the exhaust systems are used to identify an uneven distribution of the air mass fed to each of the exhaust systems, and an uneven distribution is determined by repeatedly forming a ratio of two output signals or the ratio of values derived from the output signals, and, if a predefined number of results falling outside a predefined tolerance band is exceeded, an uneven distribution is deemed to be present.

2. The method according to claim 1, wherein an uneven distribution is determined by repeatedly forming a difference between two output signals or the difference between values derived from the output signals, and, if a predefined number of results falling outside a predefined tolerance band is exceeded, an uneven distribution is deemed to be present.

3. The method according to claim 1, wherein an uneven distribution is determined by repeatedly forming a ratio or a difference of a lambda controller deviation and, if a predefined number of results falling outside a predefined tolerance band is exceeded, an uneven distribution is deemed to be present.

4. The method according to claim 1, further comprising determining in which of the exhaust systems too little secondary air is being introduced in relation to a default value.

5. The method according to claim 1, wherein limits of the tolerance band are selected as a function of at least one of values ambient temperature, exhaust gas back pressure, ambient pressure, and absolutely measured lambda.

6. The method according to claim 1, wherein the total secondary air mass flow fed to the exhaust systems is recorded by a single secondary air mass meter disposed in a common secondary air line and checked for plausibility with a predefined nominal value, if a fault is indicated, a check is performed to determine whether an uneven distribution is present, and in the event of a positive result, the uneven distribution is confirmed and a fault entry is made in a fault memory both in respect of defective secondary air mass flow and in respect of uneven distribution.

7. The method according to claim 1, wherein the total secondary air mass flow fed to the exhaust systems is recorded by a single secondary air mass meter disposed in a common secondary air line and checked for plausibility with a predefined nominal value, if a fault is indicated, a check is performed to determine whether an uneven distribution is present, and in the event of a negative result, a fault entry is made in a fault memory in respect of defective secondary air mass flow.

8. The method according to claim 1, wherein the total secondary air mass flow fed to the exhaust systems is recorded by a single secondary air mass meter disposed in a common secondary air line and checked for plausibility with a predefined nominal value, if no fault is indicated, a check is performed to determine whether an uneven distribution is present, and in the event of a positive result, a fault entry is made in a fault memory in respect of uneven distribution.

9. The method according to claim 1, wherein the total secondary air mass flow fed to the exhaust systems is recorded by a single secondary air mass meter disposed in a common secondary air line and checked for plausibility with a predefined nominal value, if no fault is indicated, a check is performed to determine whether an uneven distribution is present, and in the event of a negative result, the secondary air system is classified as operating properly.

10. The method according to claim 1, wherein the total secondary air mass flow fed to the exhaust systems is determined from a signal of an air mass meter disposed in an intake port of the internal combustion engine via modeling and checked for plausibility with a predefined nominal value, if a fault is indicated, a check is performed to determine whether an uneven distribution is present, and in the event of a positive result, the uneven distribution is confirmed and a fault entry is made in a fault memory both in respect of defective secondary air mass flow and in respect of uneven distribution.

11. The method according to claim 1, wherein the total secondary air mass flow fed to the exhaust systems is determined from a signal of an air mass meter disposed in an intake port of the internal combustion engine via modeling and checked for plausibility with a predefined nominal value, if a fault is indicated, a check is performed to determine whether an uneven distribution is present, and in the event of a negative result, a fault entry is made in a fault memory in respect of defective secondary air mass flow.

12. The method according to claim 1, wherein the total secondary air mass flow fed to the exhaust systems is determined from a signal of an air mass meter disposed in an intake port of the internal combustion engine via modeling and checked for plausibility with a predefined nominal value, if no fault is indicated, a check is performed to determine whether an uneven distribution is present, and in the event of a positive result, a fault entry is made in a fault memory in respect of uneven distribution.

13. The method according to claim 1, wherein the total secondary air mass flow fed to the exhaust systems is determined from a signal of an air mass meter disposed in an intake port of the internal combustion engine via modeling and checked for plausibility with a predefined nominal value, if no fault is indicated, a check is performed to determine whether an uneven distribution is present, and in the event of a negative result, the secondary air system is classified as operating properly.

14. The method according to claim 2, further comprising determining in which of the exhaust systems too little secondary air is being introduced in relation to a default value.

15. The method according to claim 2, wherein limits of the tolerance band are selected as a function of at least one of values ambient temperature, exhaust gas back pressure, ambient pressure, and absolutely measured lambda.

16. The method according to claim 3, further comprising determining in which of the exhaust systems too little secondary air is being introduced in relation to a default value.

17. The method according to claim 3, wherein limits of the tolerance band are selected as a function of at least one of values ambient temperature, exhaust gas back pressure, ambient pressure, and absolutely measured lambda.

18. A system for monitoring feeding of secondary air into an exhaust gas of an internal combustion engine, comprising:
  at least two partly separate exhaust systems in each of which are disposed a catalytic converter, and upstream thereof, a lambda probe;
  a secondary air pump and a plurality of individual secondary air lines corresponding to the plurality of exhaust systems to deliver secondary air to each of the respective exhaust systems; and
  at least one air mass meter from whose signal a value for the total air mass flow introduced into the exhaust systems can be determined, wherein
  to determine the air mass actually introduced into each of the exhaust systems, the output signals from the lambda probes in the exhaust systems are used to identify an uneven distribution of the air mass fed to the individual exhaust systems, and an uneven distribution is determined by repeatedly forming a ratio of two output signals or the ratio of values derived from the output signals, and, if a predefined number of results falling outside a predefined tolerance band is exceeded, an uneven distribution is deemed to be present.

* * * * *